Patented Nov. 21, 1950

2,530,653

UNITED STATES PATENT OFFICE 2,530,653

BENZHYDRYL ESTERS AS INSECTICIDES

Peter L. de Benneville, Philadelphia, Pa., and Howard D. Segool, Flushing, N. Y., assignors to Allied Chemical & Dye Corporation, a corporation of New York No Drawing. Application April 11, 1946, Serial No. 661,354

2 Claims. (Cl. 167—30)

This invention relates to a new class of insecticidal materials useful for combatting both chewing and sucking insects.

We have discovered compounds having the following general formula possess insecticidal activity and are useful for combatting both chewing and sucking insects

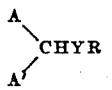

in which A and A' denote aryl radicals, R denotes a member selected from the group consisting of alkyl groups and halo-alkyl groups containing not over 6 carbon atoms and Y denotes a radical selected from the group consisting of the radicals —OCO— and —(OCH$_2$CH$_2$)$_n$OCO— wherein $n$ denotes a whole number from 1 to 3.

Among the compounds which we have found to be effective insecticides may be mentioned benzhydryl acetate, benzhydryl trichloro acetate, ethylene glycol benzhydryl ether acetate and diethylene glycol benzhydryl ether acetate. Simple esters of benzhydrol employed in accordance with this invention, e. g. the acetate, may be prepared in conventional manner by esterifying benzhydrol with an aliphatic carboxylic acid containing not over 7 carbon atoms, or its anhydride; or such esters may be prepared by reacting benzhydryl chloride with the sodium salt of the carboxylic acid, this method being particularly suitable in preparing esters of relatively unreactive carboxylic acids such as trichlor acetic acid. It is to be understood that benzhydrol or benzhydryl chloride may be employed as starting materials, or derivatives thereof having as nuclear substituents halogen, particularly chlorine, atoms, alkyl groups or halo-alkyl groups may be employed; thus, in addition to benzhydrol, the compounds of our invention may be prepared from substituted benzhydrols such as 4,4'-dichlorobenzhydrol or 2,4'-dimethylbenzhydrol, and in place of benzhydryl chloride, similar derivatives may be used. The aliphatic carboxylic acid employed may contain substituents such as halogen atoms; thus, in addition to acids such as acetic acid, propionic acid, n-butyric acid, isobutyric acid and the like, derivatives thereof such as trichlor acetic acid and β-bromopropionic acid may be employed, the acids being utilized as such or in the form of their salts, depending upon the method of preparation used.

The compounds of our invention in which Y in the above structural formula represents the radical (OCH$_2$CH$_2$)$_n$OCO, i. e. benzhydryl ether esters, may be prepared by etherifying benzhydrol or a substituted benzhydrol with a glycol, such as ethylene glycol or diethylene glycol, and then esterifying the resulting ether alcohol; etherification of the benzhydrol is most advantageously carried out by converting benzhydrol or a nuclear substituted derivative thereof to the corresponding chloride and then reacting the chloride with the glycol to form the ether.

The compounds of our invention may be employed as insecticides by applying them to the insect, if a sucking insect is to be combatted, or, in the case of chewing insects, to fruit or foliage of plants or to any other host with which the insect to be controlled may come in contact. These compounds have been found suitable for control of both chewing insects such as Mexican bean beetle larvae and sucking insects such as pea aphid and green chrysanthemum aphid. They are compatible with and may be used with sticking, spreading and wetting agents, diluents and other materials commonly used in combination with insecticides. The compounds of our invention are preferably applied in combination with a carrier therefor; for example in the form of a dust prepared by dispersing the insecticide in an inert powder, such as a finely powdered clay, or as an aqueous emulsion.

The following table gives results of tests carried out to determine the insecticidal activity of typical compounds coming within the scope of our invention. In carrying out the tests below described insecticidal activity with respect to the insects named was determined as follows:

(A) *Mexican bean beetle larvae (MBBL)*.—The compounds to be tested were dissolved in acetone, the acetone solution was admixed with an inert powdered clay and the acetone then evaporated to form a dust containing the indicated percentage of active ingredient. The dust was then applied to bean plants and the plants infested with five larvae and confined in wire cages. Dead larvae were counted at the end of 120 hours and the percent control calculated as described below.

(B) *Pea aphid* (PA).—Adult pea aphids were placed in wire cages and sprayed for ten seconds with a fine mist of the compound to be tested emulsified in water in the amounts indicated. Broad windsor bean plants were then placed in the cages for the aphids to feed upon and percent control was calculated after 72 hours.

(C) *Green chrysanthemum aphid* (GCA).—Individual chrysanthemum leaves were infested with aphids and then sprayed with an aqueous emulsion containing the compound tested in the amounts indicated and the leaves then placed upon paper having tanglefoot barriers to prevent escape of the aphids. At the end of 24 hours percent control was calculated as described below.

In all tests percent control was calculated in accordance with the formula $$\text{Per cent control} = \frac{X-Y}{X} \times 100$$

where X equals percent living on check plant and Y equals percent living on treated plants. The tests gave the following results:

| Compound Tested | Conc. | Insect | Larval Stage | Per Cent Control |
|---|---|---|---|---|
| $(C_6H_5)_2CHOCOCH_3$ | 1:800 | GCA | Adult | 94 |
| Do | 1:800 | PA | do | 67.8 |
| $(C_6H_5)_2CHOCOCCl_3$ | 5% | MBBL | 3rd | 68.4 |
| $(C_6H_5)_2CHOCH_2CH_2OCH_2CH_2OCOCH_3$ | 5% | MBBL | 3rd | 73.3 |

The following examples illustrate preparation of the compounds of our invention. Amounts are given in parts by weight.

*Example 1.*—200 parts of benzhydrol and 216 parts of acetic anhydride were mixed and heated for three hours at 90°–100° C. and the mixture then permitted to stand for four days. The excess acetic anhydride and acetic acid by-product were removed by distillation and the residue was vacuum distilled, whereby a fraction boiling within the range of 119°–126° C. at 1 mm. pressure was recovered; upon redistillation a fraction having a boiling range of 136° C. at 2 mm. pressure to 148° C. at 4 mm. pressure was recovered consisting chiefly of benzhydryl acetate.

*Example 2.*—30 parts of benzhydryl chloride and 32 parts of sodium trichloroacetate were dissolved in 72 parts of dioxane and the mixture refluxed for 12 hours. The mass was then drowned in water, extracted with benzene and the extract distilled. After removal of the benzene, a product boiling over the range of 185°–190° C. at 7 mm. pressure, and comprising chiefly benzhydryl trichloroacetate was recovered.

*Example 3.*—184 parts of benzhydrol were dissolved in 260 parts of toluene, the mixture heated to reflux and gassed with dry hydrogen chloride for about nine hours; a benzhydryl chloride fraction boiling from 116°–118° C. at 2 mm. pressure was then recovered by distillation. 136 parts of the chloride were mixed with 445 parts of ethylene glycol and 75 parts of sodium carbonate and the mixture agitated for 30 minutes at a temperature of 90°–95° C. The mass was then filtered and 102.5 parts of an impure monobenzhydryl glycol ether recovered from the filtrate by distillation, a fraction boiling at 148°–154° C. at 2.5 mm. pressure being collected. This product was then dissolved in 92 parts acetic anhydride, 10 parts of sodium acetate were added and the mixture stirred at a temperature of 95°–105° C. for five hours and then drowned in water. The drowned mass was permitted to stand overnight, was then agitated for one hour and sodium carbonate added until the mixture was alkaline to phenolphthalein. The mass was then extracted with ether, washed with water until neutral, dried over sodium sulfate and distilled, a fraction boiling between 170°–174° C. at 4.5 to 5 mm. pressure being recovered. This fraction was then redistilled to recover a fraction boiling at 167°–173° C. at 4 mm. pressure, which fraction comprised chiefly ethylene glycol benzhydryl ether acetate.

*Example 4.*—386 parts of diethylene glycol were mixed with 65 parts of anhydrous sodium carbonate and 122 parts of benzhydryl chloride were added thereto. The mass was then gradually heated to a temperature of 90°–100° C. and maintained at this temperature for two hours. At the end of this time the mass was permitted to cool and was filtered. The filtrate was then distilled. After removal of unreacted diethylene glycol, an intermediate fraction boiling between 122°–188° C. at 8 mm. pressure and a main fraction boiling from 188° C. up to 208° C. at 8 to 8.5 mm. pressure were collected. These fractions were then combined and redistilled, 87 parts of a fraction boiling between 160°–172° C. at 0.5 mm. pressure being recovered. This product was then mixed with 108 parts of acetic anhydride and 10 parts of sodium acetate and the mixture heated for 4½ hours at 95°–100° C. The resulting mass was drowned in water, permitted to stand, and was then extracted with ether, washed with water until neutral and distilled. After recovery of forerunnings which were discarded, a main fraction boiling from 175°–183° C. at 1 mm. pressure was recovered; this fraction upon analysis was found to be diethylene glycol benzhydryl ether acetate.

Since certain changes may be made in carrying out the above process without departing from the scope of the invention, it is intended that all matter contained in the above description shall be interpreted as illustrative and not in a limiting sense.

We claim:

1. An insecticidal composition comprising a compound having the structural formula

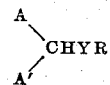

in which A and A' each denote the phenyl radical, R denotes a member selected from the group consisting of alkyl groups and halo-alkyl groups containing not over 6 carbon atoms and Y denotes a radical selected from the group consisting of the radicals —OCO— and —(OCH$_2$CH$_2$)$_n$OCO—

$n$ denoting a whole number from 1 to 3, dispersed in an aqueous emulsion.

2. An insecticidal composition comprising the compound benzhydryl acetate dispersed in an aqueous emulsion.

PETER L. DE BENNEVILLE.
HOWARD D. SEGOOL.

(References on following page)

REFERENCES CITED

The following references are of record in the file of this patent:

UNITED STATES PATENTS

| Number | Name | Date |
|---|---|---|
| 1,948,894 | Weiler et al. | Feb. 27, 1934 |
| 2,329,074 | Muller | Sept. 7, 1943 |

OTHER REFERENCES

Morton et al., OSRD Insect Control Committee Report No. 16, Feb. 1, 1945; Committee on Medical Research and Development OEM cmr-M-4331, pages 1, 2, 21.

Linduska et al., Ibid. Report No. 28, May 18, 1945, pages 1-3, 29.

Boyd et al., Jr. Chemical Society of London, part 1, 1927, page 901.